United States Patent
Ng et al.

(10) Patent No.: US 8,634,466 B2
(45) Date of Patent: Jan. 21, 2014

(54) VIDEO DECODER PLUS A DISCRETE COSINE TRANSFORM UNIT

(75) Inventors: Gregory C. Ng, Austin, TX (US); Yong Yan, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 680 days.

(21) Appl. No.: 12/405,305

(22) Filed: Mar. 17, 2009

(65) Prior Publication Data

US 2010/0239006 A1 Sep. 23, 2010

(51) Int. Cl.
*H04N 11/02* (2006.01)

(52) U.S. Cl.
USPC ............ 375/240.13; 375/240.03; 375/240.14; 375/240.15; 375/240.16; 375/240.18; 375/240.24; 375/240.25; 375/240.26

(58) Field of Classification Search
None
See application file for complete search history.

(56) References Cited

U.S. PATENT DOCUMENTS

| | | | | |
|---|---|---|---|---|
| 5,832,124 A | * | 11/1998 | Sato et al. | 382/238 |
| 6,115,070 A | * | 9/2000 | Song et al. | 375/240.12 |
| 7,936,818 B2 | * | 5/2011 | Jayant et al. | 375/240.05 |
| 2004/0013202 A1 | * | 1/2004 | Lainema | 375/240.18 |
| 2005/0157797 A1 | * | 7/2005 | Gaedke | 375/240.24 |
| 2006/0233250 A1 | * | 10/2006 | Cha et al. | 375/240.12 |
| 2008/0037637 A1 | * | 2/2008 | Kawashima et al. | 375/240.13 |
| 2008/0165849 A1 | * | 7/2008 | Moriya et al. | 375/240.15 |
| 2008/0232463 A1 | * | 9/2008 | Lu et al. | 375/240.02 |
| 2008/0232471 A1 | * | 9/2008 | Mittal et al. | 375/240.13 |
| 2008/0310507 A1 | * | 12/2008 | Ye et al. | 375/240.12 |
| 2010/0239006 A1 | * | 9/2010 | Ng et al. | 375/240.13 |
| 2011/0090969 A1 | * | 4/2011 | Sung et al. | 375/240.25 |
| 2012/0213277 A1 | * | 8/2012 | Kondo et al. | 375/240.12 |

* cited by examiner

*Primary Examiner* — William C Vaughn, Jr.
*Assistant Examiner* — Luis M Perez
(74) *Attorney, Agent, or Firm* — James L. Clingan, Jr.

(57) ABSTRACT

A video encoder and a decoder analyze the spatial content video data in an H.264 stream using the discrete cosine transform (DCT). Although the DCT is computed as part of the H.264 encoding process, it is not computed as part of the decoding process. Thus, one would compute the DCT of the video data after it has been reconstructed by the video decoder for video post-processing or enhanced video encoding. A method for accelerating the computation of the DCT at the decoder side when transmitting intra-mode macroblocks uses information computed by the encoder and transmitted as part of the H.264 video stream.

19 Claims, 3 Drawing Sheets

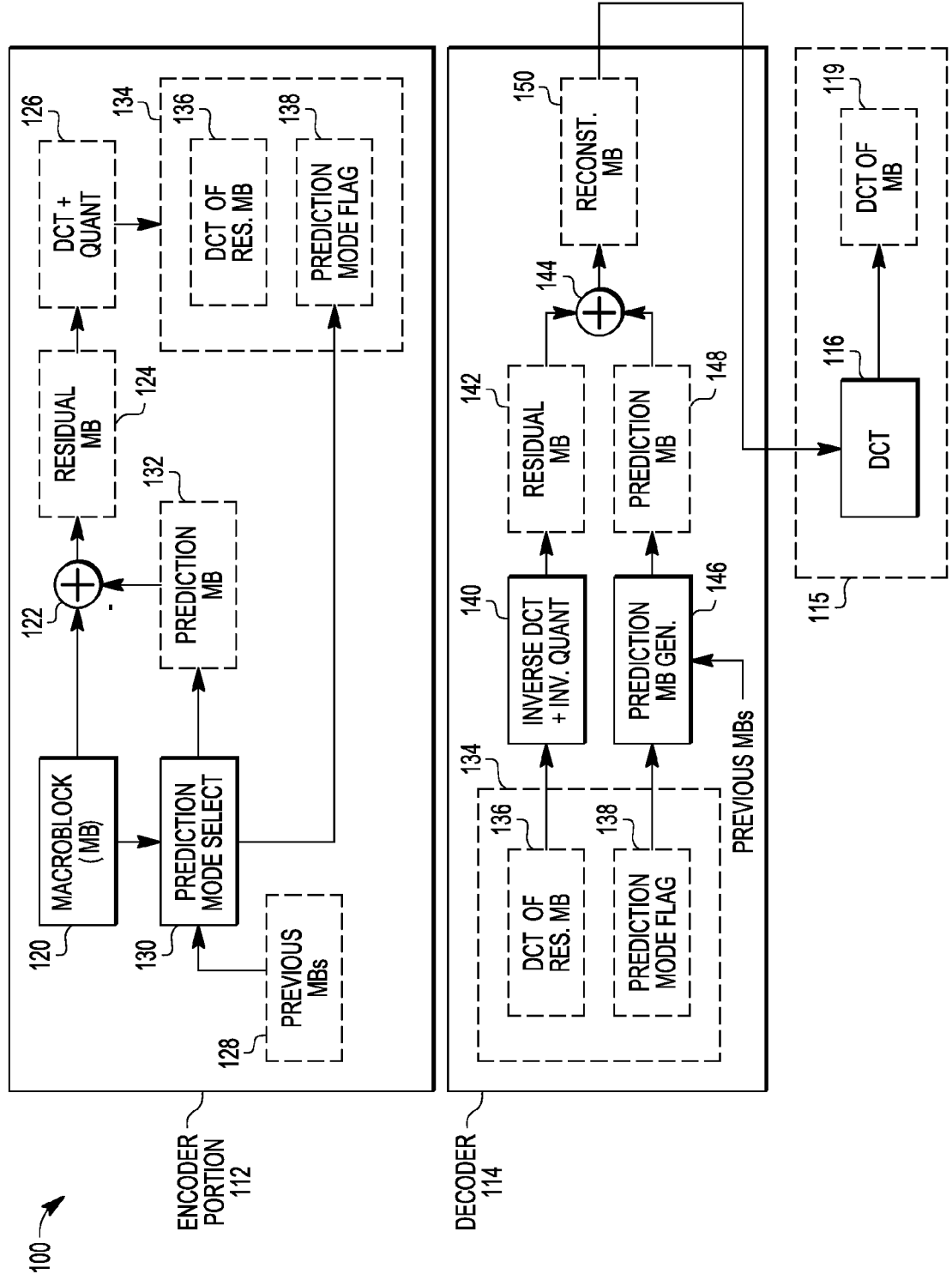

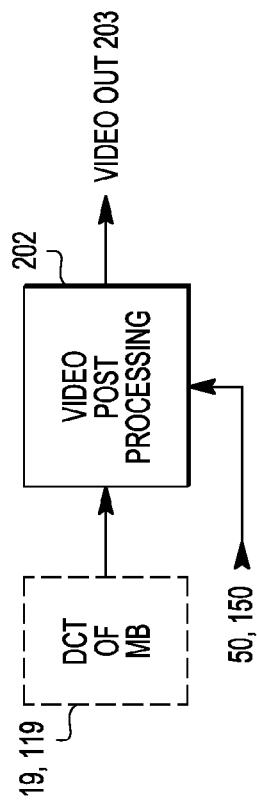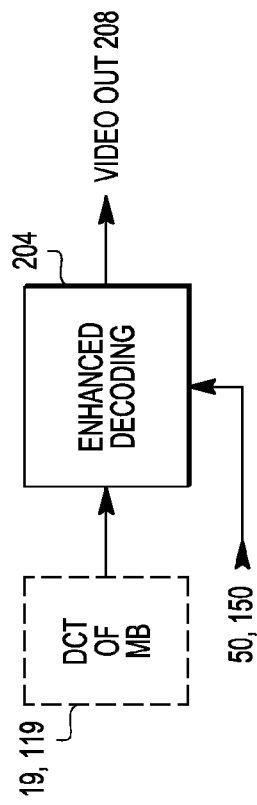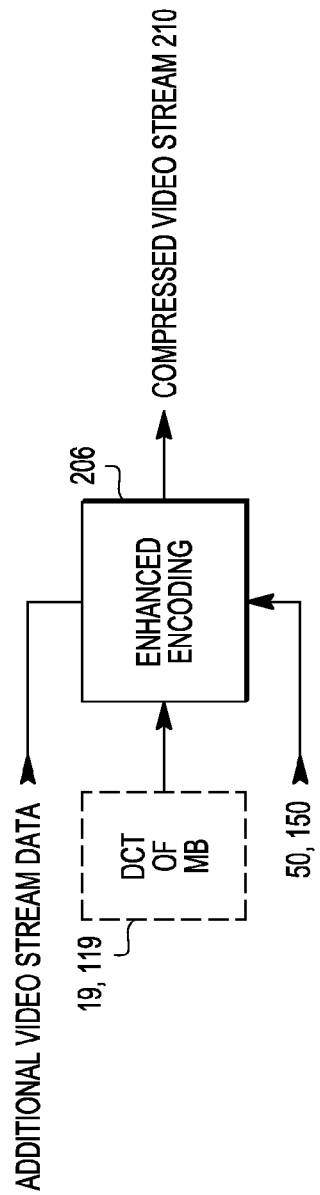

US 8,634,466 B2

VIDEO DECODER PLUS A DISCRETE COSINE TRANSFORM UNIT

BACKGROUND

1. Field

This disclosure relates generally to decoders, and more specifically, to video decoders.

2. Related Art

Video decoding when video is transmitted from a source to a receiver. The receiver needs to be prepared for the type of signal being received and standards have been and continue to be developed for this purpose. One standard for such purpose is a standard of the International Telecommunications Union (ITU) known as H.264. This standard is potentially applicable to any video transfer and has become particularly useful in cellular phone applications where video is being transmitted. Because video is transmitting so much data, it can be very time consuming to perform high quality video transfers using a cellular phone. Thus, there is a continuing need for increasing the speed of performing a video transfer at high quality. A video received may be downloaded to another medium such as a computer or even displayed on a television where the demand for improved quality is even higher. The H.264 standard uses compression to improve speed. One technique is to take advantage of spatial redundancy which identifies and transmits differences of adjacent portions of a frame. This is helpful in some ways but the demand for high quality continues, especially without sacrificing much if any speed.

Thus there is a need for a decoder that improves on the speed and/or quality of current decoders.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 2 is a block diagram of a decoder according to a second embodiment;

FIG. 3 is a block diagram of a first use of the decoders of FIGS. 1 and 2;

FIG. 4 is a block diagram of a second use of the decoders of FIGS. 1 and 2; and

FIG. 5 is a block diagram of a third use of the decoders of FIGS. 1 and 2;

DETAILED DESCRIPTION

Figure 1:
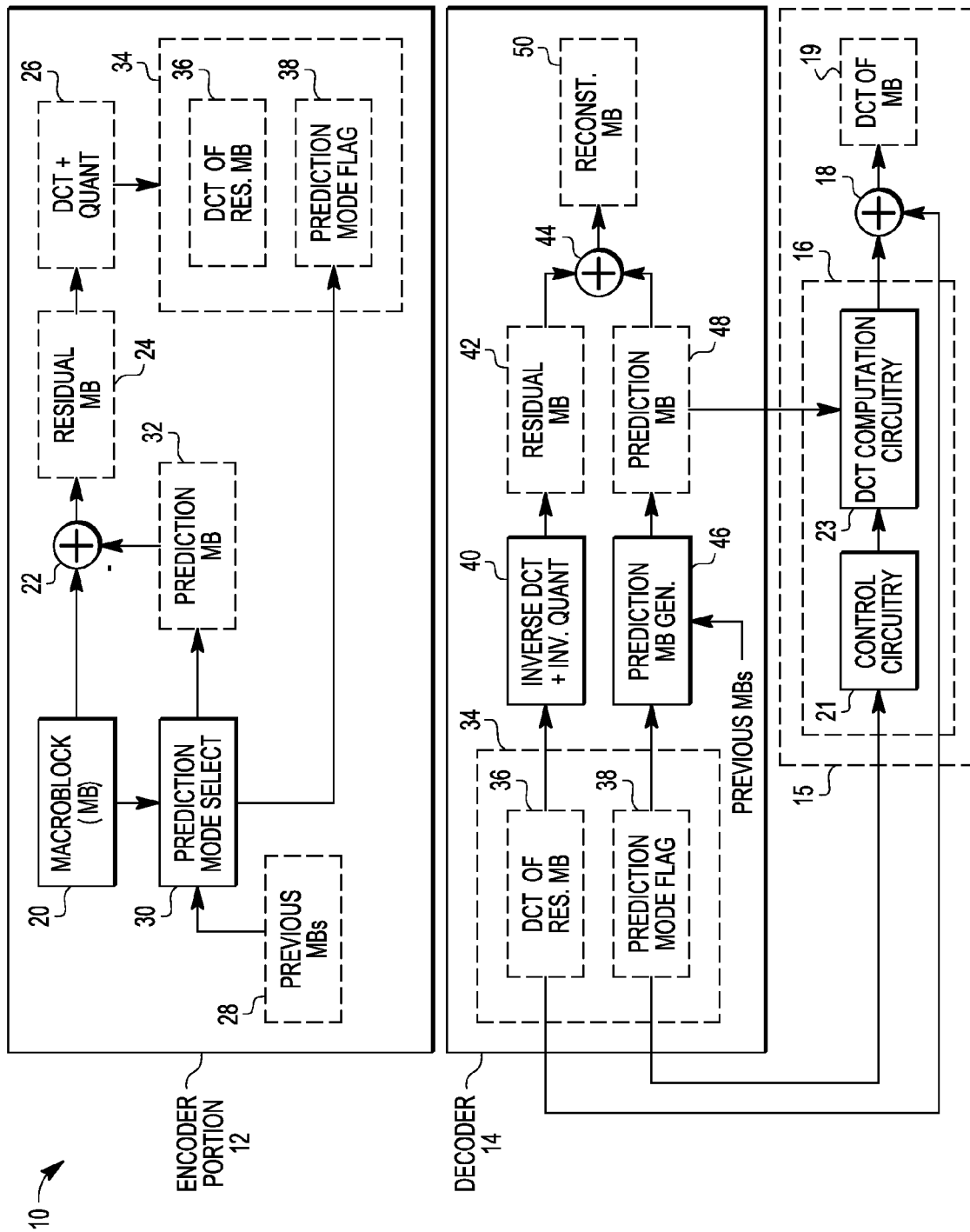
FIG. 1 is a block diagram of a decoder according to a first embodiment.

In one aspect, a video encoder and a decoder analyze the spatial content video data in an H.264 stream using the discrete cosine transform (DCT). Although the DCT is computed as part of the H.264 encoding process, it is not computed as part of the decoding process. Thus, one would compute the DCT of the video data after it has been reconstructed by the video decoder for video post-processing or enhanced video encoding. A method for accelerating the computation of the DCT at the decoder side when transmitting intra-mode macroblocks uses information computed by the encoder and transmitted as part of the H.264 video stream. This is better understood by reference to the following description and the drawings.

Shown in FIG. 1 an encoder 10 comprising an encoder portion 12, a decoder 14, and a discrete cosine transform (DCT) unit. The blocks made with dotted lines represent data that may be stored in registers or possibly a memory. Encoder portion 12 comprises a macroblock (MB) 20 of data representing a portion of a frame, a subtractor 22 that receives MB 20, a residual macroblock 24 of data at an output of subtractor 22, a DCT and quantizer 26 that receives residual MB 24, a previous MB 28 of data, a prediction mode select 30 that receives MB 20 and previous MB 28, a prediction MB 32 of data that is provided on an output of prediction mode select 30, and video stream data 34 provided by prediction mode select 30 and DCT and quantizer 26. Video stream data 34 comprises a DCT of residual MB 36 of data provided by DCT and quantizer 26 and a prediction mode flag 38 of data provided by prediction mode select 30. Encoder portion 12 is known to one of ordinary skill in the art for being part of an encoder that implements the H.264 standard.

A macroblock in this context is a portion of a frame. In the specific example of the H.264 standard, implementations are a square portion of pixels of a frame in which each side of the square is a power of 2. For example, a macroblock may be a 4×4 portion of a frame. Frame sizes can vary. One example of a frame is data for 1920×1080 pixels which is for the 1080P standard used in high definition televisions. Another example of a frame is 176 by 144 known as QCIF resolution which is commonly used in mobile phones.

Decoder 14 also comprises video stream data 34 which comprises DCT of residual block 36 of data and prediction mode flag 38 of data. Decoder 14 further comprises inverse DCT and inverse quantizer 40 that receives DCT of residual MB, a residual MB 42 as an output of inverse DCT and inverse quantizer 40, a prediction MB generator 46 that receives prediction mode flag 38 of data, a prediction MB 48 of data provided by prediction MB generator 46, an adder that receives residual MB 42 and prediction MB 48 and provides reconstructed MB 50 of data. Decoder 14 is known to one of ordinary skill in the art for being part of an encoder that implements the H.264 standard. Further one of ordinary skill in the art would understand that decoder 14 could also be used for decoding video data that was being received so that the video data would be decoded into a form usable for a display. In such case DCT of residual MB 36 and prediction mode flag 38 would be from the incoming video stream instead of from encoder portion 12.

DCT unit 15 receives prediction MB 48, prediction mode flag 38, and DCT of residual MB 36. DCT unit comprises a DCT 16 that receives prediction mode flag 38 and prediction MB 48, a summer 18 that receives an output of DCT 16 and prediction mode flag 38 and provides an output DCT of MB 19 of data. DCT 16 comprises control circuitry 21 having an input for receiving prediction mode flag 38 and DCT computation circuitry 23 having a first input coupled to an output of control circuitry 21, a second input for receiving prediction MB 48, and an output coupled to summer 18.

Shown in FIG. 2 an encoder 10 comprising an encoder portion 112, a decoder 114, and a discrete cosine transform (DCT) unit 115. DCT unit 115 comprises DCT 116 and DCT of MB 119. The blocks made with dotted lines represent data that may be stored in registers or possibly a memory. Encoder portion 112 comprises a macroblock (MB) 120 of data representing a portion of a frame, a subtractor 122 that receives MB 120, a residual macroblock 124 of data at an output of subtractor 122, a DCT and quantizer 126 that receives residual MB 124, a previous MB 128 of data, a prediction mode select 130 that receives MB 120 and previous MB 128, a prediction MB 132 of data that is provided on an output of prediction mode select 130, and video stream data 134 provided by prediction mode select 130 and DCT and quantizer 126. Video stream data 134 comprises a DCT of residual MB 136 of data provided by DCT and quantizer 126 and a prediction mode flag 138 of data provided by prediction mode select 130. Encoder portion 112 is known to one of ordinary skill in the art for being part of an encoder that implements the H.264 standard. As used herein, subtractor is a unit that takes as input two macroblocks of identical dimensions such as both being 4×4 pixels, and outputs a macroblock where each pixel is the difference between the corresponding pixels of the input.

Decoder 114 also comprises video stream data 134 which comprises DCT of residual block 136 of data and prediction mode flag 138 of data. Decoder 114 further comprises inverse DCT and inverse quantizer 140 that receives DCT of residual MB, a residual MB 142 as an output of inverse DCT and inverse quantizer 140, a prediction MB generator 146 that receives prediction mode flag 138 of data, a prediction MB 148 of data provided by prediction MB generator 146, an adder that receives residual MB 142 and prediction MB 148 and provides reconstructed MB 150 of data. Decoder 114 is known to one of ordinary skill in the art for being part of an encoder that implements the H.264 standard. Further one of ordinary skill in the art would understand that decoder 114 could also be used for decoding video data that was being received so that the video data would be decoded into a form usable for a display. In such case DCT of residual MB 136 and prediction mode flag 138 would be from the incoming video stream instead of from encoder portion 112.

DCT unit comprises a DCT 116 that receives reconstructed MB 150 and provides a DCT of MB 119 of data. Because DCT 116 receives reconstructed MB 150, separate control circuitry, such as control circuitry 21 of FIG. 1, is not necessary although it is not necessarily precluded either.

Whether provided by DCT unit 16 or 116, DCT of MB 19 and DCT of MB 119 are the same data for a given input. The DCT of MB 19, 119 has several potential beneficial uses whether the decoder is part of the encoder or not.

To encode a macroblock 20/120 into an H.264 stream, an H.264 encoder, such as an encoder portion 12/112, takes a macroblock MB 20/120 of video data and computes the quantities as shown in FIGS. 1 and 2. It then encodes the DCT of the residual macroblock 24, 124 and a prediction mode flag 38, 138 into the video sequence. To reconstruct the original macroblock, the decoder 14/114 applies an inverse computation, as shown in FIGS. 1 and 2.

To compute the DCT of this macroblock at the decoder side, the DCT of the reconstructed macroblock 150 can be directly computed as shown in FIG. 2. An alternative shown in FIG. 2 is to use the linearity property of the DCT and compute the DCT of the prediction macroblock 48 and add (44) this to the DCT of the residual macroblock 134. Both methods require an additional DCT computation, and the method of FIG. 2 also requires an additional matrix sum. However, in the method of FIG. 2, the DCT cannot be computed until after the inverse discrete transform (IDCT) of the normal decoder flow. On the other hand, the method of FIG. 1 allows the DCT to take place concurrently with the IDCT. The overhead required to compute the DCT of the prediction macroblock can be beneficially reduced by taking advantage of the structure imposed by the prediction modes.

Intra prediction modes are modes defined in H.264. Each of the intra prediction modes specifies how the codec, which is an encoder (which typically includes a decoder) plus a decoder plus other features involved in providing the encode and decode, should incorporate data from neighboring, previously-decoded macroblocks 28/128 to form the prediction. For example, a vertical prediction mode selects a bottom row of the macroblock 20/120 directly above the current macroblock and replicates this row through all rows in this macroblock. Each of the other prediction modes filters and replicates neighboring pixels. In general, these filtered pixels are replicated to multiple positions in the current prediction macroblock 32/132. Analytically computing the DCT allows for exploit this structure and redundant data.

The forward DCT for H.264 can be computed by applying the transformation matrices $T_i$ to the 4×4 macroblock M in the following way:

$$T_1 = \begin{bmatrix} 1 & 1 & 1 & 1 \\ 2 & 1 & -1 & -2 \\ 1 & -1 & -1 & 1 \\ 1 & -2 & 2 & -1 \end{bmatrix}, \quad T_2 = \begin{bmatrix} 1 & 2 & 1 & 1 \\ 1 & 1 & -1 & -2 \\ 1 & -1 & -1 & 2 \\ 1 & -2 & 1 & -1 \end{bmatrix}$$

$$DCT\{M\} = T_1 M T_2$$

In general, this transformation would take 64 additions/subtractions and 16 scalings (implementable as binary shifts when scaling by a power of 2) when posed as DCT 116. A DCT 116 that meets these criteria may be known as a Fast DCT.

In a DC prediction mode (Intra_4×4_DC), all the values of macroblock 48 are formed by taking the average of available pixels neighboring macroblock 48.

$$M_{pred} = \begin{bmatrix} k_0 & k_0 & k_0 & k_0 \\ k_0 & k_0 & k_0 & k_0 \\ k_0 & k_0 & k_0 & k_0 \\ k_0 & k_0 & k_0 & k_0 \end{bmatrix}$$

$$k_0 = \frac{1}{\#P} \sum_{p_i \in P} p_i$$

In this equation $p_i$ represents the pixels within a previous macroblock selected by prediction mode select 130. The DCT performed by DCT 16, and more particularly computation circuitry 23, of this prediction matrix is $$DCT\{M_{pred}\}[0,0] = k_0$$

$$DCT\{M_{pred}\}[i,j] = 0, \text{ otherwise.}$$

For the vertical prediction mode (Intra_4×4_Vertical), prediction macroblock 48 defined by the H.264 standard has the form:

$$M_{pred} = \begin{bmatrix} k_0 & k_1 & k_2 & k_3 \\ k_0 & k_1 & k_2 & k_3 \\ k_0 & k_1 & k_2 & k_3 \\ k_0 & k_1 & k_2 & k_3 \end{bmatrix},$$

where $k_i$ are coefficients obtained from the bottom row of the macroblock vertically above this macroblock. This predicted macroblock can only have horizontal frequency components. Explicit computation shows the DCT of M to be $$DCT\{M_{pred}\} = \begin{bmatrix} 4(k_0+k_1+k_2+k_3) & 8(k_0-k_3)+4(k_1-k_2) & 4(k_0-k_1-k_2+k_3) & 4(k_0-k_3)-8(k_1-k_2) \\ 0 & 0 & 0 & 0 \\ 0 & 0 & 0 & 0 \\ 0 & 0 & 0 & 0 \end{bmatrix}$$

Thus, we see that this simplifies to the complexity of a 1-D DCT. By factoring appropriately and reusing terms, we can reduce the number of required additive operations to eight and the number of scalings to six. An additive operation is defined as an addition or subtraction.

$\mathrm{DCT}\{M_{pred}\}[0,0]=4[(k_0+k_3)+(k_1+k_2)]$ $\mathrm{DCT}\{M_{pred}\}[0,1]=[8(k_0+k_3)+4(k_1-k_2)]$ $\mathrm{DCT}\{M_{pred}\}[0,2]=4[(k_0+k_3)-(k_1+k_2)]$ $\mathrm{DCT}\{M_{pred}\}[0,3]=[4(k_0-k_3)-8(k_1-k_2)]$ $i \neq 0 \Rightarrow \mathrm{DCT}\{M_{pred}\}[i,j]=0$ For the horizontal prediction mode (Intra_4×4_Horizontal), the DCT of prediction macroblock 48 in the case of DCT 16 are similarly simple, except that the nonzero terms occur for vertical spatial frequencies. Prediction macroblock 148 has the form $$M_{pred} = \begin{bmatrix} k_0 & k_0 & k_0 & k_0 \\ k_1 & k_1 & k_1 & k_1 \\ k_2 & k_2 & k_2 & k_2 \\ k_3 & k_3 & k_3 & k_3 \end{bmatrix}$$

$\mathrm{DCT}\{M_{pred}\}[0,0]=4[(k_0+k_3)+(k_1+k_2)]$ $\mathrm{DCT}\{M_{pred}\}[1,0]=[8(k_0+k_3)+4(k_1-k_2)]$ $\mathrm{DCT}\{M_{pred}\}[2,0]=4[(k_0+k_3)-(k_1+k_2)]$ $\mathrm{DCT}\{M_{pred}\}[3,0]=[4(k_0-k_3)-8(k_1-k_2)]$ $j \neq 0 \Rightarrow \mathrm{DCT}\{M_{pred}\}[i,j]=0$ The computational complexity of this case is the same as for the Intra_4×4_Vertical case.

In the diagonal down left prediction mode (Intra_4×4_Diagonal Down Left) the predicted macroblock has the structure.

$$M_{pred} = \begin{bmatrix} k_0 & k_1 & k_2 & k_3 \\ k_1 & k_2 & k_3 & k_4 \\ k_2 & k_3 & k_4 & k_5 \\ k_3 & k_4 & k_5 & k_6 \end{bmatrix}$$

With:

$a_0 = k_2 + k_4 \quad a_7 = a_0 - a_2 \quad b_0 = 4a_4$ $a_1 = k_2 - k_4 \quad a_8 = -a_5 + a_6 \quad b_1 = 2a_4$ $a_2 = k_0 + k_6 \quad a_9 = -2a_1 + a_3 \quad b_2 = 3a_0 = 2a_0 + a_0$ $a_3 = k_0 - k_6 \quad a_{10} = a_0 + 2(a_2 - a_4) - a_4 \quad b_3 = 10k_3 = 8k_3 + 2k_3$ $a_4 = k_1 + k_5 \quad a_{11} = c_1 - c_5 - a_3 \quad b_4 = 4k_3$ $a_5 = k_1 - k_5 \quad a_{12} = -a_5 + 2a_9 \quad c_1 = 2a_1 + a_1$ $a_6 = a_1 + a_3 \quad a_{13} = 2a_6 + c_5 \quad c_5 = 2a_5 + a_5$ $$DCT\{M_{pred}\} = \begin{bmatrix} a_2+b_1+b_2+b_4 & a_{13} & -a_7 & a_8 \\ a_{13} & 4a_2+b_0-b_2-b_3 & a_{12} & a_{10} \\ -a_7 & a_{12} & -a_0+a_2-b_1+b_4 & a_{11} \\ a_8 & a_{10} & a_{11} & 8a_0+a_2-b_0-b_3 \end{bmatrix}$$

This shows that this requires 33 additive operations and 11 scalings by a power of two.

In the diagonal down left prediction mode (Intra_4×4_Diagonal_Down_Right) the predicted macroblock has the structure:

$$M_{pred} = \begin{bmatrix} k_0 & k_1 & k_2 & k_3 \\ k_4 & k_0 & k_1 & k_2 \\ k_5 & k_4 & k_0 & k_1 \\ k_6 & k_5 & k_4 & k_0 \end{bmatrix}$$

With:

$$a_0 = k_3 + k_6 \quad a_7 = a_2 - a_0 \quad b_0 = 8k_0 + 2k_0$$
$$a_1 = k_3 - k_6 \quad a_8 = a_5 - a_6 \quad b_1 = 4a_4$$
$$a_2 = k_1 + k_4 \quad a_9 = -a_2 - 2(a_0 - a_4) + a_4 \quad b_2 = 2a_4$$
$$a_3 = k_1 - k_4 \quad a_{10} = 2a_1 - 4a_3 - a_5 \quad b_3 = 2a_2 + a_2$$
$$a_4 = k_2 + k_5 \quad a_{11} = c_5 + 2a_6 \quad b_4 = 4k_0$$
$$a_5 = k_2 - k_5 \quad a_{12} = a_1 + c_3 - c_5 \quad c_3 = 2a_3 + a_3$$
$$a_6 = a_1 - a_3 \quad c_5 = 2a_5 + a_5$$

$$DCT\{M_{pred}\} = \begin{bmatrix} a_0 + b_2 + b_3 + b_4 & -a_{11} & -a_7 & a_8 \\ a_{11} & -4a_0 + b_0 - b_1 + b_3 & a_{10} & a_9 \\ -a_7 & -a_{10} & -a_2 + a_0 - b_2 + b_4 & -a_{12} \\ -a_8 & a_9 & a_{12} & -8a_2 - a_0 + b_0 + b_1 \end{bmatrix}$$

This shows that this requires 33 additive operations and 11 scalings by a power of two.

Thus shown is that the DCT for five prediction macroblock modes can be simplified. Additionally, the same approach can be used to simplify the calculation of prediction macroblocks for other prediction modes as well.

The precise amount of time required to perform this computation would depend on what technology were used to implement it (e.g., in hardware as RTL, in software on a given processor architecture, etc. The above measures of operational complexity are intended to demonstrate the relative complexity of computing the DCT of macroblock for each prediction mode in a way that is relatively independent of architecture and technology.

From [1], we find that DCT 116 requires 64 additive operations to compute, and 16 scalings, which can be implemented as shifts.

| Pred. Mode | Additive Ops | Scalings |
|---|---|---|
| Vertical | 8 | 6 |
| Horizontal | 8 | 6 |
| DC | 0 | 1 |
| Diag Down Left | 33 | 11 |
| Diag Down Right | 33 | 11 |
| Vertical Right | 58 | 32 |
| Horizontal Down | 56 | 29 |
| Vertical Left | 52 | 21 |
| Horizontal Up | 61 | 18 |

The above table shows how many operations are required for DCT 16 to compute the DCT of prediction macroblock 48. That is, DCT 16 only computes DCT of a macroblock generated by Prediction Macroblock Generator 46. We wish to compute the DCT of the prediction macroblock 48 plus the residual, so we must add the DCT of the residual macroblock 42 to the DCT of the prediction macroblock 48. This means that 16 more additions are required. Therefore, the total operation count would be

| Pred. Mode | Additive Ops | Scalings |
|---|---|---|
| Vertical | 24 | 6 |
| Horizontal | 24 | 6 |
| DC | 16 | 1 |
| Diag_Down Left | 49 | 11 |
| Diag_Down Right | 49 | 11 |
| Vertical Right | 74 | 32 |
| Horizontal Down | 72 | 29 |
| Vertical Left | 68 | 21 |
| Horizontal Up | 77 | 18 |

In the last four cases as shown in the table, which are vertical right and left and horizontal up and down, the total number of operations required is greater than the number of operations required for DCT 116. Therefore, if presented with a macroblock whose prediction mode is one of these modes, DCT 116 would provide more benefit in terms of operation count, at the expense of concurrency.

Shown in FIGS. 3, 4, and 5 are exemplary uses of DCT 19 and 119 which provide DCT of MB 19 and 119, respectively. FIG. 3 shows a video post processing circuit 202 having a first input for receiving DCT of MB 19/119, a second input for receiving the output of reconstructed MB 50/150 for providing an enhanced video out 203. Video post processing includes enhancing processes such as upsampling and noise reduction. The DCT of MB 19/119 provides for improved choices for both upsampling and noise reduction. FIG. 4 similarly shows an enhanced decoding circuit having a first input for receiving DCT of MB 19/119, a second input for receiving the output of reconstructed MB 50/150 for providing an enhanced video out 208. Enhanced decoding circuit 204 provides refined decoding that is further enhanced by using DCT of MB 19, 119. FIG. 5 shows an enhanced encoding circuit having a first input for receiving DCT of MB 19/119, a second input for receiving the output of reconstructed MB 50/150, and a third input for receiving additional video streaming data for providing an enhanced compressed video stream 210. Enhanced compressed video stream 210 and enhanced video outs 206 and 208 are forms of video output signals.

Although the invention is described herein with reference to specific embodiments, various modifications and changes can be made without departing from the scope of the present invention as set forth in the claims below. For example, a single line was drawn serially through the cores from the group controller, this may be achieved with multiple lines or different lines from the group controller. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. An apparatus comprising:
    a decoder that receives
        a prediction mode flag and
        a discrete cosine transform (DCT) of a residual macroblock
        and provides a prediction macroblock;
    control circuitry which receives the prediction mode flag, wherein the prediction mode flag indicates which one of a plurality of intra prediction modes has been selected, said control circuitry providing one or more control signals;
    computation circuitry coupled to the control circuitry to receive the one or more control signals, said computation circuitry also receiving the prediction macroblock, when a first one of the plurality of intra prediction modes has been selected said computation circuitry performing a first plurality of computations on the prediction macroblock to produce a DCT of the prediction macroblock, when a second one of the plurality of intra prediction modes has been selected said computation circuitry performing a second plurality of computations on the prediction macroblock to produce the DCT of the prediction macroblock, wherein the first plurality of computations and the second plurality of computations are different; and
    addition circuitry coupled to the computation circuitry to receive the DCT of the prediction macroblock, the addition circuitry adding the DCT of the prediction macroblock to the DCT of a residual macroblock to produce a DCT of the macroblock.

2. An apparatus as in claim 1, wherein the first plurality of computations comprises a first number of additive operations and a second number of scaling operations, and wherein the second plurality of computations comprises a third number of additive operations and a fourth number of scaling operations.

3. An apparatus as in claim 2, wherein when the first one of the plurality of intra prediction modes is a DC mode, the first number of additive operations is zero and the second number of scaling operations is not greater than one.

4. An apparatus as in claim 3, wherein when the second one of the plurality of intra prediction modes is a vertical mode, the third number of additive operations is not greater than eight and the fourth number of scaling operations is not greater than six.

5. An apparatus as in claim 3, wherein when the second one of the plurality of intra prediction modes is a horizontal mode, the third number of additive operations is not greater than eight and the fourth number of scaling operations is not greater than six.

6. An apparatus as in claim 3, wherein when the second one of the plurality of intra prediction modes is a diagonal down left mode, the third number of additive operations is not greater than thirty-three and the fourth number of scaling operations is not greater than eleven.

7. An apparatus as in claim 1, wherein data provided in the macroblock is determined by the H.264 standard.

8. An apparatus as in claim 1, further comprising:
    circuitry for generating a video output, said circuitry for generating the video output being coupled to the addition circuitry for receiving the DCT of the macroblock, said circuitry for generating the video output combining a reconstructed macroblock and the DCT of the macroblock to generate the video output.

9. An apparatus as in claim 8, wherein the video output is a compressed video stream.

10. An apparatus as in claim 8, wherein the circuitry for generating the video output comprises decoding circuitry.

11. An apparatus as in claim 8, wherein the circuitry for generating the video output comprises encoding circuitry.

12. A method for generating a discrete cosine transform (DCT) of a macroblock, the method comprising:
    providing a prediction mode flag, wherein the prediction mode flag indicates which one of a plurality of intra prediction modes has been selected;
    providing a DCT of a residual macroblock;
    providing a prediction macroblock responsive to the prediction mode flag and the DCT of the residual macroblock;
    when a first one of the plurality of intra prediction modes has been selected,
    performing a first plurality of computations on the prediction macroblock to produce a DCT of the prediction macroblock;
    when a second one of the plurality of intra prediction modes has been selected, performing a second plurality of computations on the prediction macroblock to produce the DCT of the prediction macroblock,
    wherein the first plurality of computations and the second plurality of computations are different; and
    adding the DCT of the prediction macroblock to the DCT of a residual macroblock to produce the DCT of the macroblock.

13. A method as in claim 12, wherein performing the first plurality of computations on a prediction macroblock to produce the DCT of the prediction macroblock comprises:
    performing a first number of additive operations; and
    performing a second number of scaling operations; and
    wherein performing the second plurality of computations on the prediction macroblock to produce the DCT of the prediction macroblock comprises:
    performing a third number of additive operations; and
    performing a fourth number of scaling operations.

14. A method as in claim 13, wherein when the first one of the plurality of intra prediction modes is a DC mode, the first number of additive operations is zero and the second number of scaling operations is not greater than one.

15. A method as in claim 14, wherein when the second one of the plurality of intra prediction modes is a vertical mode, the third number of additive operations is not greater than eight and the fourth number of scaling operations is not greater than six.

16. A method as in claim 14, wherein when the second one of the plurality of intra prediction modes is a horizontal mode, the third number of additive operations is not greater than eight and the fourth number of scaling operations is not greater than six.

17. A method as in claim 14, wherein when the second one of the plurality of intra prediction modes is a diagonal down left mode, the third number of additive operations is not greater than thirty-three and the fourth number of scaling operations is not greater than eleven.

18. A method as in claim 12, further comprising: generating a video output by combining a reconstructed macroblock and the DCT of the macroblock.

19. A method as in claim 18, wherein the video output is compressed and wherein the step of generating the video output comprises encoding the DCT of the macroblock.

* * * * *